J. TWEEDY.
Cultivators.

No. 135,301. Patented Jan. 28, 1873.

Witnesses:
E. Wolff
C. Sedgwick

Inventor:
J. Tweedy
per
Attorneys.

United States Patent Office.

JOHN TWEEDY, OF VERNON, INDIANA.

IMPROVEMENT IN CORN-COVERERS.

Specification forming part of Letters Patent No. 135,301, dated January 28, 1873.

*To all whom it may concern:*

Figure 1:
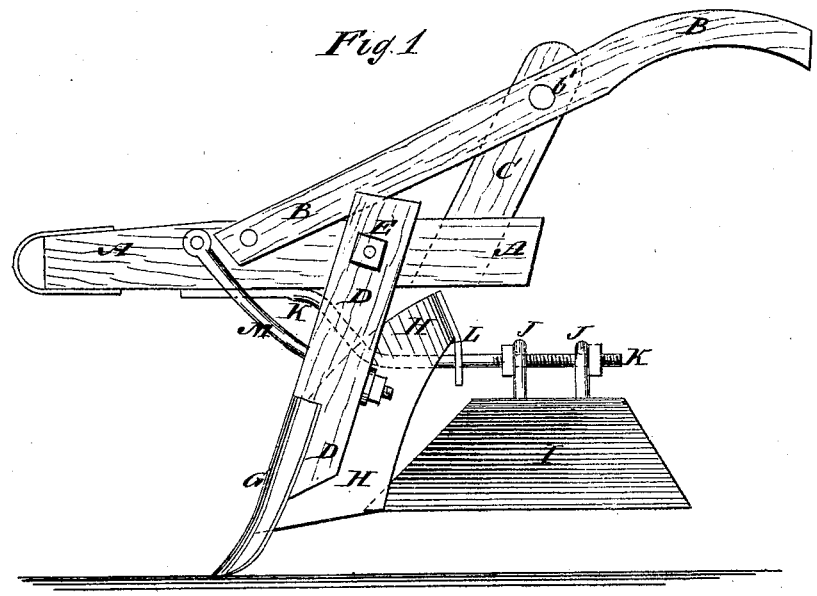
Figure 2:
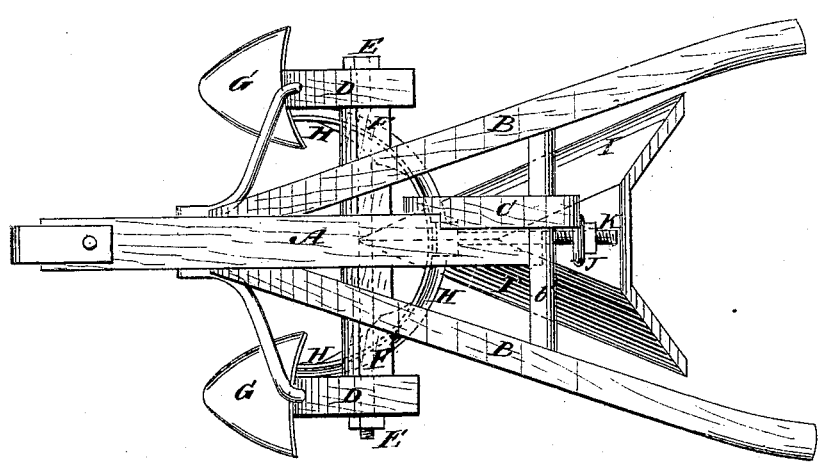

Be it known that I, JOHN TWEEDY, of Vernon, in the county of Jennings and State of Indiana, have invented a new and useful Improvement in Corn-Coverer, of which the following is a specification:

Figure 1 is a side view of my improved machine. Fig. 2 is a top view of the same.

Similar letters of reference indicate corresponding parts.

The invention consists in combining a clod-mover with a leveler and pair of covering-plows, and in the means of attaching and holding it in position.

A represents the plow-beam, to the forward end of which the draft is applied, and which is made comparatively short, as shown in Figs. 1 and 2. B are the handles, the forward ends of which are secured to the sides of the beam A, and the rear parts of which are connected and held in their proper relative position by a round, $b'$, and are supported at the proper height by an upright, C, the upper end of which is connected with the round $b'$, and the lower end of which is attached to the rear end of the beam A. D are the plow-standards, which are placed upon the opposite sides of the beam A directly opposite each other, and are secured to the said beam A by a long bolt, E, which passes through them, through the beam A, and through the blocks F interposed between the said standards and the sides of the said beam, to bring the standards to the desired distance apart. G are the plows, which are attached to the lower ends of the standards D, and are inclined inward so as to throw the soil into the furrow and cover the corn. H is a semicircular or arched mold-board, the end parts of which are attached to the inner sides of the lower parts of the standards D, and are so formed as to round up or ridge the soil over the corn so as to prevent the corn from being carried off by the crows, and to prevent the soil from being washed away by the rain. I is the sod mover or leveler, which is formed by attaching two side plates, at their upper edges, to the side edges of a small triangular top plate. The side plates incline outward, as shown in Figs. 1 and 2, and their forward edges meet in a sharp inclined edge, so that the said device may be V-shaped in its horizontal section. To the top plate of the clod-mover I are attached two long staples or loops, J, through which passes the rear end of a rod, K, upon which they are secured in place by two nuts screwed upon the said rod K—the one in front of the forward staple J, and the other in the rear of the rear staple J—so that, by moving the said nuts forward or rearward, the clod-mover I may be adjusted forward or back, as may be desired. The rod K passes through a guide or keeper, L, attached to the middle part of the semicircular or arched mold-board H, and its forward end is bent upward, and is secured to the under side of the beam A, as shown in Fig. 1. The clod-mover moves along the top of the ridge and pushes off the clods, sods, and other obstructions that might impede the corn in coming up, and thus leaves the top of the ridge in proper condition.

The seed may be dropped in advance of my machine by hand, or by a separate dropping-machine; or the dropper may be on the same frame with the devices above described.

Having thus described my invention, I claim as new and desire to secure by Letters Patent—

1. The clod-mover I, in combination with the semicircular or arched mold-board H and plows G, substantially as herein shown and described, and for the purpose set forth.

2. The combination of the long staples J, rod K, and guide or keeper L, with the clod-mover I, semicircular or arched mold-board H, and beam A, substantially as herein shown and described, and for the purposes set forth.

JOHN TWEEDY.

Witnesses:
 FRANCIS TWEEDY,
 THOMAS TWEEDY.